Sept. 6, 1949. T. S. RIGBY 2,481,346
FISHING FLOAT
Filed June 27, 1949
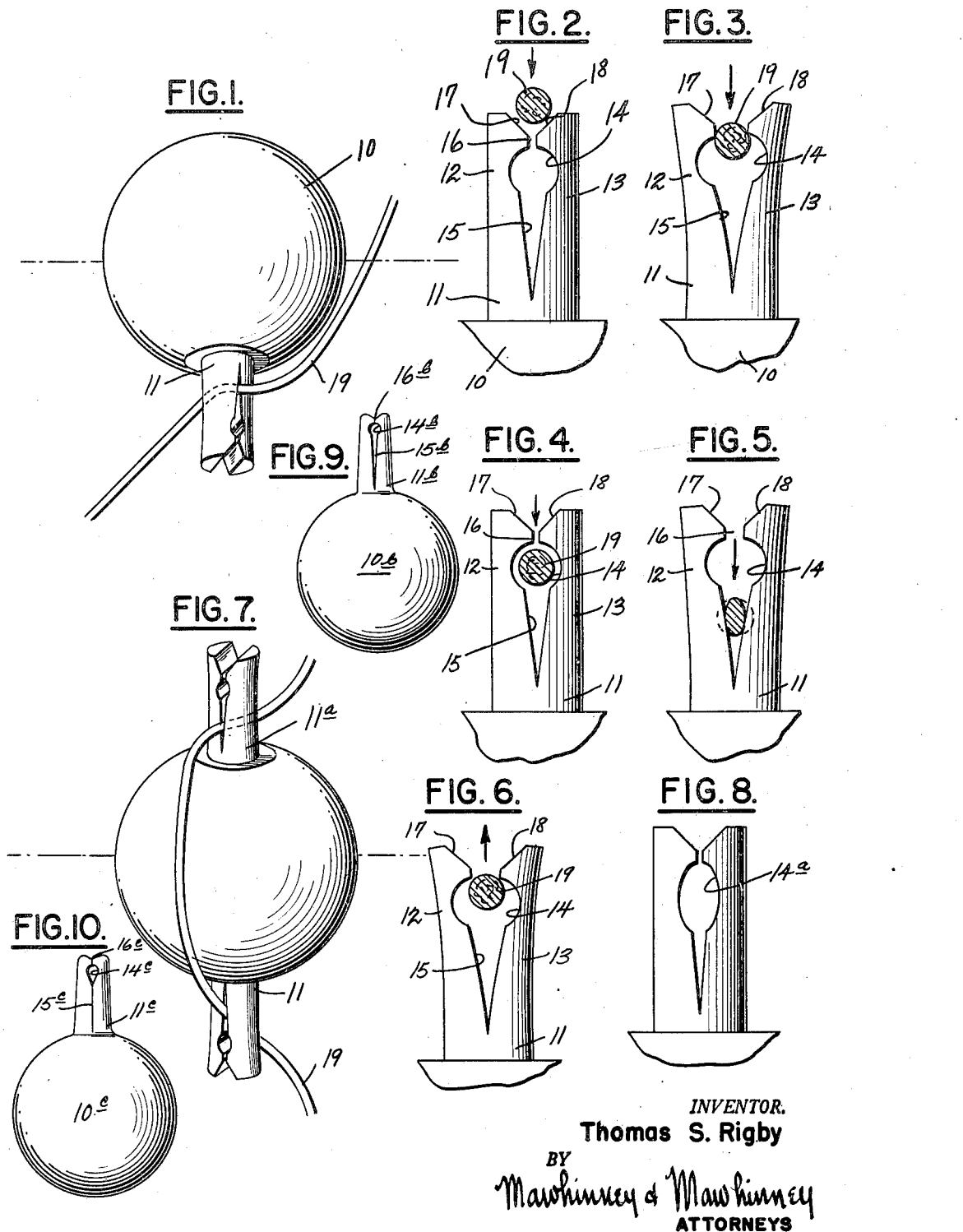
INVENTOR.
Thomas S. Rigby
BY Mawhinney & Mawhinney
ATTORNEYS _Patented Sept. 6, 1949_

2,481,346

UNITED STATES PATENT OFFICE 2,481,346

FISHING FLOAT

Thomas Scott Rigby, Miami, Fla.

Application June 27, 1949, Serial No. 101,520

2 Claims. (Cl. 43—49)

The present invention relates to improvements in fishing floats and relates more particularly to that part of the float concerned with the attachment to the fishing line.

It is an object of the invention to provide an improved fishing float attachable to a fishing line without the necessity of tying the line to the float and in which the arrangement is such that the float can be moved at will along the line without removing it from the line or untying the line at any time a change in position of the float relatively to the line is desired.

Another object of the invention is to provide an improved fishing float having a line attaching part which so entrains the line that, while the float is freed in one condition to slide along the line, the float may not disengage itself from the line except by positive force exerted in a particular direction; and therefore the arrangement reduces, and practically eliminates, the possibility of loss of the float from the line.

A further object of the invention is to provide an improved fishing float with a line-engaging part constructed of two relatively movable members, one at least of which is resilient, with a line engaging wedge slot in alignment with a line freeway for loosely receiving the line to permit sliding of the float along the line, and a constricted mouth with convergent lips leading thereto, in which the lips, mouth, freeway and wedge slot are all in substantial alignment to permit the line to be forced through the lips in the first instance with the members relatively spreading to permit the line to pass through the constricted mouth or throat and to thereupon enter the freeway and subsequently after adjustment to be forced into the wedge slot to retain the float in place on the line; and in which the line thus moves in a single direction and in a right line path from entering lips to wedge slot; and in which the line also moves in a straight path in returning the line to the freeway and outwardly through the constricting throat or mouth to disengaged position.

A still further object of the invention is to provide an improved fishing float as defined in the immediately preceding paragraph in which the walls of the freeway adjacent the constricted throat or mouth are formed in a manner complementary to the convergent lips whereby pressure of the fishing line in a direction outwardly of the straight path will react upon such walls of the freeway to pry the jaws of the mouth apart to permit passage of the line therethrough and the freeing of the line from engagement with the float.

In one form of the invention the fishing float and the line attaching part may be molded simultaneously and integrally of a homogeneous plastic material in one simple plastic molding operation without the use of any metal parts whatsoever and without requiring any subsequent assembly job in attaching metal or other parts to the float body; this for the end and purpose of producing a device which may be made in quantities at small cost and by a simple operation, in which the possibility of rust or corrosion is removed and in which there are no sharp parts or edges apt to cut the fishing line.

With the foregoing and other objects in view, the invention will be more fully described hereinafter; and will be more particularly pointed out in the claims appended hereto.

In the drawings, wherein like symbols refer to like or corresponding parts throughout the several views, Figure 1 is a perspective view of one form of a fishing float and line-attaching device as constructed in accordance with the present invention showing the fishing line wedged into the wedge slot.

Figure 2 is a fragmentary side elevational view taken on an enlarged scale of a portion of the float and the line engaging part with the line indicated in section as approaching the convergent lips.

Figure 3 is a similar view showing the separation of the members constituting the line engaging part and the line passing through the constricted throat or mouth.

Figure 4 is a similar view with the line shown entered into the freeway and with the resilient members closing upon such line.

Figure 5 is a similar view showing the line wedged into the wedge slot and the members sprung slightly apart.

Figure 6 is a similar view showing the line being forced outwardly in the direction of the arrow to pry the resilient members apart.

Figure 7 is a modified form of float having two shafts or stems in which the line retaining parts are built and both of which are shown as engaging the fishing line, and Figure 8 is also a fragmentary side elevational view similar to Figure 2 but showing a modified form of the invention in which the freeway is elliptical instead of circular.

Figure 9 is a side elevational view showing a form of narrow wedge slot and tightly-closed jaws, and Figure 10 is a similar view illustrating completely closed forms of jaws and wedge-slot.

Referring more particularly to the drawings, 10 designates a float body of any particular type, form or material and 11 represents a line-retaining shaft or stem which is split longitudinally for a portion of its length in order to provide two complementary members 12 and 13 which are relatively movable toward and from one another and one at least of which possesses inherent resiliency to cause the same to assume the position shown in Figure 2.

Within this stem is formed a line freeway or opening 14 shown in Figures 1 to 7 inclusive to be substantially circular and of a diameter somewhat larger than the fishing line indicated at 19.

The freeway communicates with the larger end of a wedge slot 15 formed in the inner end of the stem 11. The freeway also communicates at its outer side with a narrow throat or mouth 16 which is closed by the inherent elasticity of one or both members 12 and 13. Outwardly beyond the constricted throat or mouth 16 are convergent lips 17 for guiding the line 19 to the throat.

In the use of the device, the normal position of the members 12 and 13 of the stem 11 are as indicated in Figure 1, although the throat 16 may be completely closed, if desired. The resiliency inherent in the one or both members 12 and 13 will bias the two members to this relatively closed position of the jaws 16; closed position meaning that the gap across the throat 16 will be narrower than the diameter of the fishing line 19.

As shown by the arrow in Figure 2 by exerting pressure upon the fishing line 19 centrally downward of the axis of the stem 11 such line will be caused to ride down the convergent lips 17 and 18 which act in the capacity of inclined planes and thus tend to force the members open, as indicated in Figure 3, to a degree which will permit the passage of the larger diameter fishing line 19 through the constricted throat 16 and into the freeway 14, as shown in Figure 4.

As soon as the fishing line 19 passes the jaws of the throat 16 the inherent resiliency of the members 12 and 13 or either one of them, will cause the members 12 and 13 to automatically close upon the fishing line and the float will thereupon be entrained with the fishing line and captive thereon except that while the line 19 is in the freeway 14 the float may be slid back and forth on the fishing line 19 until it takes up a proper position thereon.

When the line is thus lengthened or shortened the fishing line 19 is forced inwardly as shown by the arrow in Figure 5 into the inwardly convergent portion of the wedge slot 15. For this purpose the fingers of the hand may be placed on opposite sides of the stem 11 so as to engage portions of the line at opposite sides of the stem and the line is thus pushed inwardly of the stem toward the float body 10. Proportionately to the depth at which the fishing line is entered in the wedge slot 15 the stem members 12 and 13 will be pried apart which action will be resisted by the inherent resiliency of the stem which will thus cause the members to tightly frictionally grip the fishing line and therefore hold the float on the line into adjusted position. Should it become necessary or desirable later to adjust the float to a different position the fishing line 19 will be moved back to the freeway 14 where the float will be free to be shifted back and forth.

In removing the float from the fishing line force may be applied axially outwardly of the stem 11, as shown in Figure 6. In this form of the invention the freeway 14 is substantially circular and the fishing line 19 will engage the outer curved portions of the freeway wall which will tend to cam or pry the members 12 and 13 apart when sufficient pressure is exerted by the fishermen upon the line in this outwardly direction thus opening the jaws and permitting escape of the fishing line.

In some cases the float may be made with a single stem 11, as shown in Figure 1, or with twin or duplex stems 11 and 11a, as shown in Figure 7. The intervening portion of the fishing line in Figure 7 after being engaged with one stem 11 is simply carried around the float body 10 and engaged with the companion stem 11a.

In Figure 8 the freeway or line opening 14a is shown elliptical with the major axis of the ellipse coincident with the wedge slot 15 and the constricted throat 16 whereby to facilitate the movement of the fishing line 19 from the freeway into the wedge slot or out through the constricted throat; it being understood that the curvatures of the walls of the ellipse adjacent the wedge slot and the throat have a greater slope than the circular wall of the freeway 14. In fact the outer walls of the ellipse 14a are substantially complementary to the inclination of the lips 17 and 18.

It will be noted that in entering the fishing line in engagement with the line retaining part of the float the fishing line moves in one continuous straight path from the position of Figure 2 to the position of Figure 5 and in disengaging the line from the stem 11 such line also moves outwardly in a right line path throughout. This arrangement enables the line to be not only engaged with the stem 11 by the simple act of forcing the line into the device but it also enables the line to be disengaged by a like procedure in which the application of force to the line will simply pull the line and the float apart. In other words it is not necessary to pry the jaws apart with one hand or with some instrument in one hand and then to pull the fishing line out from the stem by the other hand. In fact it is necessary to hold the float in one hand and the line in the other so that there is no hand left to push any part out of the way to permit the line to be removed. In the present device while holding the float in one hand and the line in the other hand by pushing the hands in opposite directions the float will be automatically disengaged from the line.

While the device may be made of wood, metal or other desired materials, it is preferred to manufacture it from some plastic material such for instance as acetate, polystyrene or some other synthetic resin. Such materials have less "give" and no tendency to take a "set" at the neck or stem portion where the spring-closing effect is so important. Then plastics or resins lend themselves to formation in one simple plastic molding operation. In other words the float body and the stem 11 could be molded in one operation and there would be no parts to assemble afterwards. With plastic there would be no rust or corrosion and there would be no sharp burrs, as in the case of metal stampings, and burrs are undesirable as they are apt to cut the fishing line. The molding of plastic material will reduce the cost and simplify the operation with an attendant reduction in the cost of labor while providing a more desirable float rustproof, smooth and having no tendency to cut the line and of a very attractive appearance.

In Figure 9 the stem 11b on float 10b is provided with a narrow wedge slot 15b and a completely-closed throat 16b on opposite sides of the line freeway 14b.

In Figure 10 the wedge slot 15c is completely and tightly closed as is the throat 16c in the normal initial position of the parts before attachment of the line. This arrangement will strengthen the spring arm effect of the jaws at closing point.

The wedge slot may be a wide V or a narrow V or a virtually closed slot to give better gripping power on the line when it is pulled down into the slot.

In the claims the word "freeway" means an opening of a larger diameter than that of the fishing line whereby the float 10 and its attached stem 11 may be moved freely along the fishing line when the fishing line occupies the freeway 14 for the purpose of bringing the float to a selected location on the line, after which the line is forced into the wedge slot 15 as best seen in Figure 5. Figure 4 shows that the freeway 14 is of larger diameter than the fishing line 19 when the stem members 12 and 13 are in their normally closed position.

It is obvious that various changes and modifications may be made in the details of construction and design of the above specifically described embodiment of this invention without departing from the spirit thereof, such changes and modifications being restricted only by the scope of the following claim.

What is claimed is:

1. An improved fishing float comprising a float body, a line retaining stem carried by the body and composed of relatively movable members, one at least of which is resilient and tending to close against the companion member, said members having therebetween a wedge slot with inclined walls converging inwardly toward the float body, said members also having a fishing line freeway larger in diameter than the fishing line outwardly of the wedge slot and communicating at its inner portion with the larger end of the wedge slot, a constricted throat narrower than the diameter of the fishing line outwardly of the freeway and in alignment with the wedge slot and communicating with the outer portion of the freeway, and convergent lips on the members outwardly of and leading to said constricted throat.

2. A fishing float as claimed in claim 1 characterized by the fact that said convergent lips act as inclined planes in prying the members of the stem apart when the fishing line is forced axially inwardly of the stem whereby to open the narrow throat to permit the fishing line to enter said freeway, further characterized by the fact that the outer portions of the walls of said freeway are convergent to the constricted throat to enable the fishing line when forcibly urged outwardly to ride over such walls in prying the members apart to open the constricted throat.

THOMAS SCOTT RIGBY.

REFERENCES CITED

The following references are of record in the file of this patent:

UNITED STATES PATENTS

| Number | Name | Date |
|---|---|---|
| 179,490 | Sander | July 4, 1876 |
| 186,055 | Mihan | Jan. 9, 1877 |
| 682,954 | Olson | Sept. 7, 1901 |
| 2,181,458 | La Gue | Nov. 28, 1939 |

FOREIGN PATENTS

| Number | Country | Date |
|---|---|---|
| 87,013 | Germany | May 22, 1896 |